United States Patent
Morss et al.

(10) Patent No.: US 8,849,921 B2
(45) Date of Patent: Sep. 30, 2014

(54) METHOD AND APPARATUS FOR CREATING PREDICTIVE FILTERS FOR MESSAGES

(75) Inventors: Dylan Morss, Pleasant Hill, CA (US); Emmet Cassidy, San Francisco, CA (US)

(73) Assignee: Symantec Corporation, Mountain View, CA (US)

( * ) Notice: Subject to any disclaimer, the term of this patent is extended or adjusted under 35 U.S.C. 154(b) by 257 days.

(21) Appl. No.: 11/824,004

(22) Filed: Jun. 28, 2007

(65) Prior Publication Data

US 2009/0006569 A1    Jan. 1, 2009

(51) Int. Cl.
 *G06F 15/177* (2006.01)
 *H04L 12/58* (2006.01)
 *H04L 29/06* (2006.01)

(52) U.S. Cl.
CPC .......... *H04L 12/585* (2013.01); *H04L 63/1441* (2013.01); *H04L 63/14* (2013.01); *H04L 51/12* (2013.01); *H04L 63/145* (2013.01); *H04L 2463/144* (2013.01)
USPC .......................................... 709/206; 707/754

(58) Field of Classification Search
CPC ... H04L 12/585; H04L 63/1441; H04L 63/14; H04L 51/12; H04L 63/145; H04L 2463/144
USPC .................... 709/204–206; 707/3, 6, 754; 715/751–759
See application file for complete search history.

(56) References Cited

U.S. PATENT DOCUMENTS

| | | | |
|---|---|---|---|
| 6,779,021 B1 | 8/2004 | Bates et al. | |
| 7,320,020 B2 * | 1/2008 | Chadwick et al. | 709/206 |
| 7,487,217 B2 * | 2/2009 | Buckingham et al. | 709/206 |
| 7,529,802 B2 * | 5/2009 | Nelson et al. | 709/206 |
| 8,010,609 B2 * | 8/2011 | Cowings et al. | 709/206 |
| 8,271,588 B1 * | 9/2012 | Bruno et al. | 709/206 |
| 8,725,811 B2 * | 5/2014 | Srivastava | 709/206 |
| 2004/0210640 A1 * | 10/2004 | Chadwick et al. | 709/207 |
| 2006/0015942 A1 * | 1/2006 | Judge et al. | 726/24 |
| 2006/0031319 A1 * | 2/2006 | Nelson et al. | 709/206 |
| 2006/0179113 A1 | 8/2006 | Buckingham et al. | |
| 2006/0288076 A1 | 12/2006 | Cowings et al. | |
| 2007/0156886 A1 * | 7/2007 | Srivastava | 709/224 |

FOREIGN PATENT DOCUMENTS

| | | |
|---|---|---|
| JP | 2008060954 | 3/2008 |
| WO | WO-2006/119508 | 11/2006 |

OTHER PUBLICATIONS

European Search Report mailed Nov. 17, 2008 for EP Application No. 08010937.4-2416.

\* cited by examiner

*Primary Examiner* — Kenneth Coulter
(74) *Attorney, Agent, or Firm* — Wilmer Cutler Pickering Hale and Dorr LLP

(57) ABSTRACT

A method and apparatus for creating predictive filters for messages. In one embodiment, filter information is coupled to a reputation database. One or more filters for a message feature are generated if a reputation of the message feature is associated with one or more portions of the filter information. In one embodiment, SPAM filters are generated. In yet another embodiment, one or more message features are tested using heuristics. One or more message features are blacklisted based on a determination of the heuristics. One or more additional message filters are generated if a reputation of the message feature is associated with a blacklisted feature.

16 Claims, 3 Drawing Sheets

METHOD AND APPARATUS FOR CREATING PREDICTIVE FILTERS FOR MESSAGES

BACKGROUND OF THE INVENTION

1. Field of the Invention

Embodiments of the present invention generally relate to message communication across a network. More particularly, the present invention relates to a method and apparatus for creating predictive filters for messages using a reputation database of message features.

2. Description of the Related Art

People communicate with each other in numerous ways. For example, one person may send a message (e.g., email, text message, multi-media message, and the like) across a network (e.g., Internet) to a recipient. An email, generally, has a sender address, a recipient address, a header, a body, in addition to other sections. Before the email reaches the recipient, it is processed by a mail server. The mail server may comprise a filter that is keyed to particular features of a message. If certain features (e.g., a domain name, a name server, a country of origin, a host IP address, and the like) are present that are known to indicate sources of messages containing unwanted or harmful contact, then the email is filtered and/or prevented from reaching the recipient. Otherwise, the email is relayed to the recipient.

The presence of certain features of the message may indicate that the message is potentially hazardous to hardware, software, and/or data (e.g., SPAM, phish, malware, a virus, a Trojan, a worm, a denial of service attack and/or is an otherwise unwanted message). SPAM is a commercial message, such as an email, presenting a user with an advertisement. Phish is a process of fraudulently obtaining a person's passwords under the pretense of a legitimate message from a reputable company. Malware, viruses, Trojans, worms, and denial of service attacks are examples of potentially hazardous programs embedded in emails and executed on a computer of the recipient.

Filters help protect the hardware, software, and data of the recipient from damage. Filters are data structures that contain information on features of common unwanted messages, which are used by software programs to prevent the transmission of those unwanted messages. For example, filters may be created for domains known for sending SPAM, phish, and other unwanted messages. Filters are also created for domains known to be included in SPAM emails. In either case, filters are created for a domain only after an email is already sent to the recipient and determined to be SPAM. Consequently, damage may occur prior to a filter being created for unwanted messages.

Therefore, there is a need for a method and apparatus for creating message filters for domains before unwanted messages are sent to a recipient.

SUMMARY OF THE INVENTION

The present invention is generally a method and apparatus for creating predictive filters for messages. In one embodiment, filter information is coupled to a reputation database. One or more filters for a message feature is generated if a reputation of the message feature is associated with the filter information. In one embodiment, SPAM filters are predictively generated. In yet another embodiment, one or more message features are tested using heuristics. Based on results from the testing the one or more features, one or more message features are blacklisted. One or more additional message filters are generated if a reputation of the message feature is associated with a blacklisted feature.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

While the invention is described herein by way of example using several embodiments and illustrative drawings, those skilled in the art will recognize that the invention is not limited to the embodiments of the drawings or drawings described. It should be understood that the drawings and detailed description thereto are not intended to limit the invention to the particular form disclosed, but on the contrary, the invention is to cover all modification, equivalents and alternatives falling within the spirit and scope of the present invention as defined by the appended claims. The headings used herein are for organizational purposes only and are not meant to be used to limit the scope of the description or the claims. As used throughout this application, the "may" is used in a permissive sense (i.e., meaning must). Similarly, the words "include", "including", and "includes", mean including but not limited to.

DETAILED DESCRIPTION

Embodiments of the present invention include a method and apparatus for creating predictive filters for messages. The apparatus is embodied in a system comprising a backend message system that receives filter information and generates one or more additional filters for a message feature based on a reputation of the message feature. The backend message system updates the reputation for each message feature using field statistics.

Figure 1:
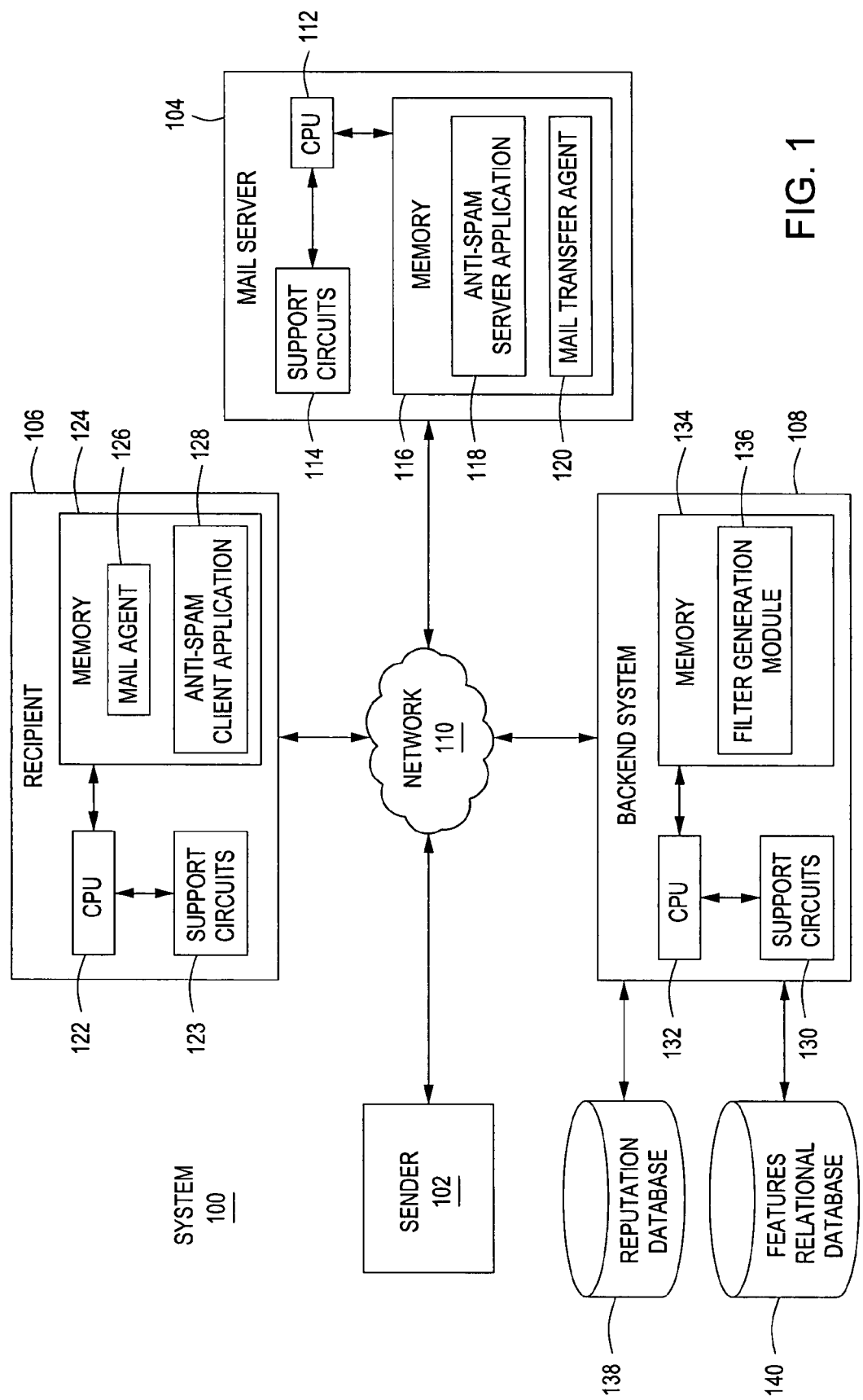
FIG. 1 depicts a block diagram of a network utilizing a filter generation module that forms one embodiment of the present invention.

FIG. 1 depicts a block diagram of a networked computer system 100 comprising a sender 102, a mail server 104, a recipient 106, and a backend system 108, each coupled to a network 110. It is well understood that although FIG. 1 illustratively refers to SPAM as the message type that is being filtered, the networked computer system 100 can be employed for creating filters for other types of unwanted email messages, such as phish and other emails embedded with at least one of viruses, worms, Trojans, and the like.

The network 110 comprises a communication system that connects a computer system by wire, cable, fiber optic, and/or wireless links facilitated by various types of well-known network elements, such as hubs, switches, routers, and the like. The network 110 may employ various well-known protocols to communicate information amongst the network resources. For example, the network 110 may be part of the Internet or intranet using various communications infrastructure such as Ethernet, WiFi, WiMax, GPRS, and the like.

The sender 102 may be a device that transmits email across the network 110 such as a computer, a server, a personal digital assistant (PDA), and the like. For the purposes of illustrating the present invention, the sender 102 is a device that sends SPAM to the recipient 106. The sender 102 is, generally, identified through an email address comprising a domain name and a mail name. The mail name is, for example, a username within a server associated with the domain name. The sender 102 is also associated with one or more message features, as described below.

The recipient 106 is any device capable of connecting to the networked computer system 100 and sending/receiving email by utilizing the mail server 104. For example, the recipient 106 may be a computer, a tablet computer, a Personal Digital Assistant (PDA), a mobile communication device such as a cellular telephone, and the like.

The recipient 106 comprises a CPU 122, support circuits 123, a memory 124. The CPU 122 may include one or more microprocessors known in the art. The support circuits 123, which support operation of the CPU 122, may include cache, power supplies, clock circuits, data registers, I/O interfaces, and the like. The memory 124 may comprise random access memory, read only memory, removable memory, flash memory, and various combinations of these types of memory. The memory 124 is sometimes referred to as main memory and may in part be used as cache memory or buffer memory. The memory 124 stores various software packages including a mail user agent 126, and an anti-SPAM client application 128. The mail user agent 126 enables the recipient 106 to couple with an inbox of stored emails in the mail server 104. The anti-SPAM client application 128 includes software for preventing the delivery of SPAM to the recipient using a SPAM policy of the recipient 106 and/or filters generated by the backend system 108.

The mail server 104, generally, is a computer and/or a system of computers designed to maintain, organize, and transfer email messages from one computer (e.g., the sender 102) to another computer (e.g., the recipient 106). The mail server 104 may also process and/or store emails before they are transferred to the recipient 106.

The mail server 104 comprises a central processing unit (CPU) 112, support circuits 114, and a memory 116. The CPU 112 may include one or more microprocessors known in the art. The support circuits 114 for the mail server 104 may include cache, power supplies, clock circuits, data registers, I/O interfaces, and the like. The memory 116 is similar to the memory 122 of the recipient 106, as described above. The memory 116 stores various software packages including an anti-spam server application 118 and a mail transfer agent 120. The anti-SPAM server application 118 includes software for preventing the transfer of email identified as SPAM to the recipient 106 using SPAM filters generated by the backend system 108. In one embodiment, the SPAM filters may be used to prevent the transmission of SPAM sent from a user of the mail server (e.g., the SPAM filters are used as outbound filters). The mail transfer agent 120 receives email between the recipient 106 and the sender 102. It is assumed that the recipient 106 can also send email and the sender 102 can also receive email. The mail transfer agent 120 may relay email to another computer as a portion of the delivery process.

The backend system 108 supports the mail server 104 and/or the recipient 106 in the networked computer system 100 with data services (e.g., data storage and/or processing) and/or application services (e.g., software agents and processes). It should be assumed that one or more backend systems are capable of supporting one or more server computers running various mail server applications and/or one or more recipient computers running various mail client applications. For the purpose of clarity, FIG. 1 depicts only one backend system supporting only one mail server and one recipient computer.

The backend system 108 comprises support circuits 130, a central processing unit (CPU) 132, and a memory 134. The support circuits 130 facilitate functionality of the CPU 132 and may include cache, power supplies, clock circuits, data registers, I/O interfaces, and the like. The CPU 132 may include one or more microprocessors known in the art. The memory 134 is similar to the memory 122, as described above. The memory 134 stores various software packages and a filter generation module 136. The filter generation module 136 is a set of processor-executable instructions for generating filters for use in the mail server 104 and the recipient 106 for filtering SPAM.

The backend system 108 is coupled to a reputation database 138 and a features relational database 140. Each database is a collection of data records. The reputation database 138 stores reputations for various message features, including blacklisted features. A reputation, generally, is a value indicating the message features relation to the overall totality of unwanted messages. The reputation of the message feature may be low or high for a variety of reasons. For example, a blacklisted host IP address, a blacklisted domain, and/or a blacklisted name server have a low reputation, as explained below. In another example, a domain that has an existing anti-SPAM filter also has a low reputation.

The features relational database 140 stores information regarding relationships (i.e., associations) between various features, such as host IP address, name servers, domain names, and the like. For example, a domain is related to a host IP address if it resolves to the host IP address. In addition, the host IP address is related to a name server that hosts the IP address. In one embodiment, if the host IP address has a message filter, then any email bearing the domain (e.g., in the body, in the header as the sender domain, and the like) is flagged and/or precluded from reaching the recipient 106, as shown below.

The various message features include but are not limited to an information regarding web site content; a number of web sites hosting malware, spyware or SPAM; a name server; a host IP address; a country of origin; a country of residence of a domain registrant; a time to live of a domain zone file record; a number of name servers associated with a domain; a whois data (i.e., a domain registration information lookup); a number of times the name server has been changed for the domain; a value indicating whether the name server has the same name as the domain; a value indicating whether the domain is being used for domain tasting (i.e., a practice of registrants using the five-day "grace period" at the beginning of a domain registration for ICANN-regulated generic top-level domains to test the marketability of a domain name); a country location of the host IP address, email, spam, and/or virus volume being sent from the domain or the host IP address based on customer field statistics; host IP addresses and/or domains known for sending exploits, malware, or other tracked categories of SPAM, open relays, IP address allocation and use history of IP addresses or ranges of IP addresses.

The reputation database 138 is built up based upon multiple features that are currently available for public consumption as well as some features that will be unique to this system based on existing product information returned from customers in the field. The reputation database 138 is updated with field statistics from various products and applications (e.g., the anti-SPAM server application 118 and the anti-SPAM client application 128) built to track and collect publicly available data such as information regarding web site content, country of origin data, and the like. Field statistics, generally, are utilized to gauge the growth of SPAM. In one embodiment, field statistics provide feedback as to firing characteristics of anti-SPAM filters as well as overall processed mail volume. Field statistics may also include information regarding overall SPAM presence, trends in SPAM, and common words in SPAM. In most cases, field statistics are generated by individual users but may also be generated by corporate entities, government agencies, and the like. Field statistics are collected from the U.S. as well as Europe, Africa, Asia, Australia, Canada, Central America, and South America.

As such, the reputation of a particular message feature changes over time as the feature becomes more or less associated with SPAM that is currently present throughout the world. For example, if a particular host IP address has maintained a high reputation in the reputation database 138, the host IP address will most likely not be associated with future SPAM. In one embodiment, domains that resolve to that particular host IP address will also most likely not be associated with SPAM. Hence, an email message with a body that has one of the domains that resolve to the particular IP address is most likely not SPAM. Unless there is another reason to block the email message, it should continue to the inbox of the recipient.

On the other hand, if the particular host IP address has a very low reputation, then the domains that resolve to the host IP address also have a very low reputation. The host IP address may have a very low reputation for various reasons. Even though one or more of the domains that resolve to the host IP address may not have been actually used in SPAM, there is a strong likelihood that it will be used in SPAM because of its relationship to the particular host IP address. Therefore, a predictive filter can be created for all the domains that resolve to that particular host IP address. In one or more embodiments, each predictive filter would contain information for recognizing the domain (e.g., in the body, message header, subject, and/or any other part of an email). Predictive filters created for such domains may be communicated to the anti-SPAM server application 118 and/or the anti-SPAM client application 128 for use in preventing the transmission of SPAM.

In one embodiment of the present invention, the backend system 108 cooperates with the mail server 104 and the recipient 106 to generate one or more message filters (e.g., a SPAM filter) if a reputation of a message feature is associated and/or related to one or more message features in a recent message filter. The backend system 108 generates the new message filter in advance of unwanted messaged being produced (i.e., the filter is produced in a predictive manner). For instance, if the backend system 108 receives a recent message filter that is configured to filter emails having the particular host IP address in the body, as described above, then the backend system 108 will lookup the particular host IP address in the reputation database 138 and identify one or more message features associated with the particular host IP address. In this example, the one or more message features may be a name server, a domain name that resolves to the particular host IP address, a country of origin, and the like. If a reputation of any of the one or more message features indicates that the message feature will most likely be associated with SPAM in the near future, then one or more message filters are created for that message feature.

In one embodiment, the one or more message filters are communicated to the anti-SPAM server application 118 in the mail server 104 and/or the anti-SPAM client application 128 in the recipient 106. The anti-SPAM server application 118 and/or the anti-SPAM client application 128 may use the one or more message filters to evaluate incoming/outgoing email messages, recognize one or more email messages as SPAM and, then, prevent the transmission of the SPAM to their intended recipients.

Figure 2:
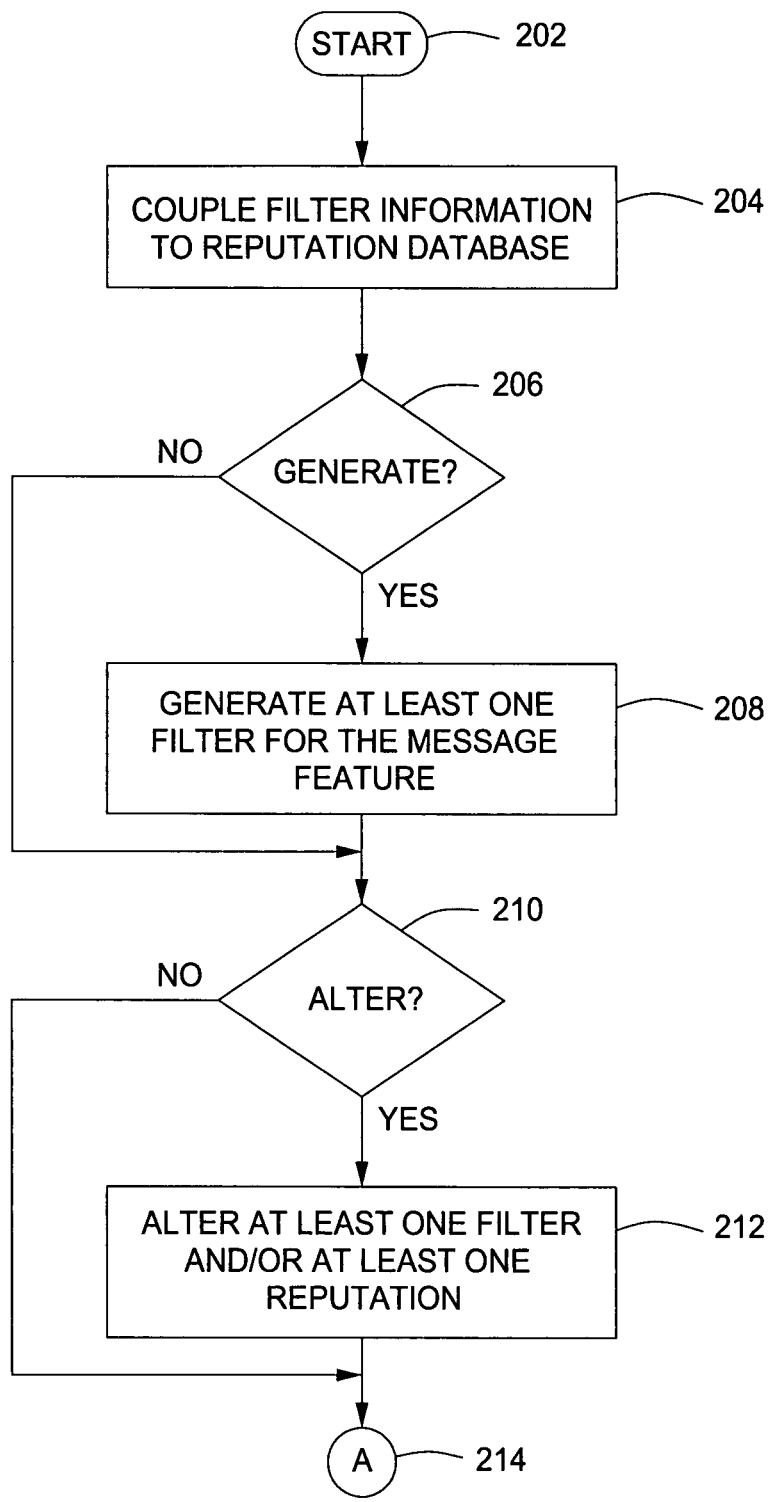
FIG. 2 is a flow diagram of a method for generating a filter in accordance with one or more embodiments of the present invention.

FIG. 2 is a flow diagram of a method 200 for generating a filter. The method 200 begins at step 202 and proceeds to step 204. At step 204, one or more SPAM filters are coupled to a backend system 108. During step 204, anti-SPAM applications and products throughout the world are producing SPAM filters for features prevalent in the latest SPAM and, then communicating the SPAM filters to the backend system 108.

At step 206, a determination is made whether to generate one or more predictive SPAM filters based on a reputation of a message feature stored in the reputation database 138 that is associated with one or more of the SPAM filters. During step 206, message features included in the SPAM filters are used to identify other message features in the reputation database 138 that exhibit a relationship to the SPAM filters. For example, a domain name is associated with a name server (e.g., a domain name server) that maps the domain name to an IP address. Therefore, if a SPAM filter is created for the domain name and the reputation of the name server indicates that the name server is most likely being used for mapping domains known for SPAM (e.g., a SPAMMY domain), then a SPAM filter should be created for every domain using that name server. Moreover, if that name server is located in Nigeria and the reputation of Nigeria as a country of origin message feature indicates that emails from Nigeria are most likely SPAM, then a SPAM filter should be generated for email originating from any name server in Nigeria.

If one or more predictive SPAM filters can be generated, the method 200 proceeds to step 208. At step 208, one or more predictive SPAM filters are generated for each associated message feature whose reputation indicates that the associated message feature will most likely be involved in SPAM in the future. A data structure is created with enough information on the associated message feature to prevent the transmission of email having the associated message feature. In one embodiment, each and every predictive SPAM filter is disseminated among anti-SPAM products and applications throughout the world.

If no predictive filter can be generated, then the method 200 proceeds to step 210. Predictive filters are not generated if there are no message features in the reputation database 138 associated with the SPAM filters and/or a reputation of an associated message feature does not indicate that the associated message feature will most likely be used in SPAM. For example, even though the name server known for sending SPAM, as described above, is associated with the message feature Nigeria as the country of origin for SPAM coming out of the name server, Nigeria may still not have a reputation value that warrants generation of a SPAM filter for all email originating from any name server in Nigeria because of numerous other factors. In one embodiment, there may be only one name server known for SPAM in all of Nigeria mixed with hundreds of non-SPAM name servers used by legitimate email users. It would be unfair and imprudent to put a blanket filter on every email originating from Nigeria. Plenty of ordinary, non-SPAM email would be considered SPAM and filtered.

At step 210, a determination is made whether to alter one or more SPAM filters and/or reputations based on reputations of message features used by the SPAM filters. During step 210, if a reputation does not indicate a strong likelihood that the message filter will be used in future SPAM, the SPAM filter for that message feature will not be as effective in preventing the transmission of SPAM anymore. Instead, the SPAM filter may prevent the transmission of legitimate email. In one embodiment, the reputation of the message filter changes based on field statistics produced by various anti-SPAM and email products and applications across the world, as described above. If one or more SPAM filters and/or reputations should be altered, then the method proceeds to step 212. If no SPAM filter and/or reputation should be altered, then the method proceeds to step 214.

At step 212, one or more SPAM filters and/or reputations are altered. At step 214, the method 200 proceeds to a method 300, described below in FIG. 3. In one embodiment, the method 200 may be repeated due to the need for more SPAM filters. In one alternative embodiment, the method 200 ends at step 214. In either case, the reputation database must be updated with one or more portions of statistics produced by various anti-SPAM and email products and applications across the world.

Figure 3:
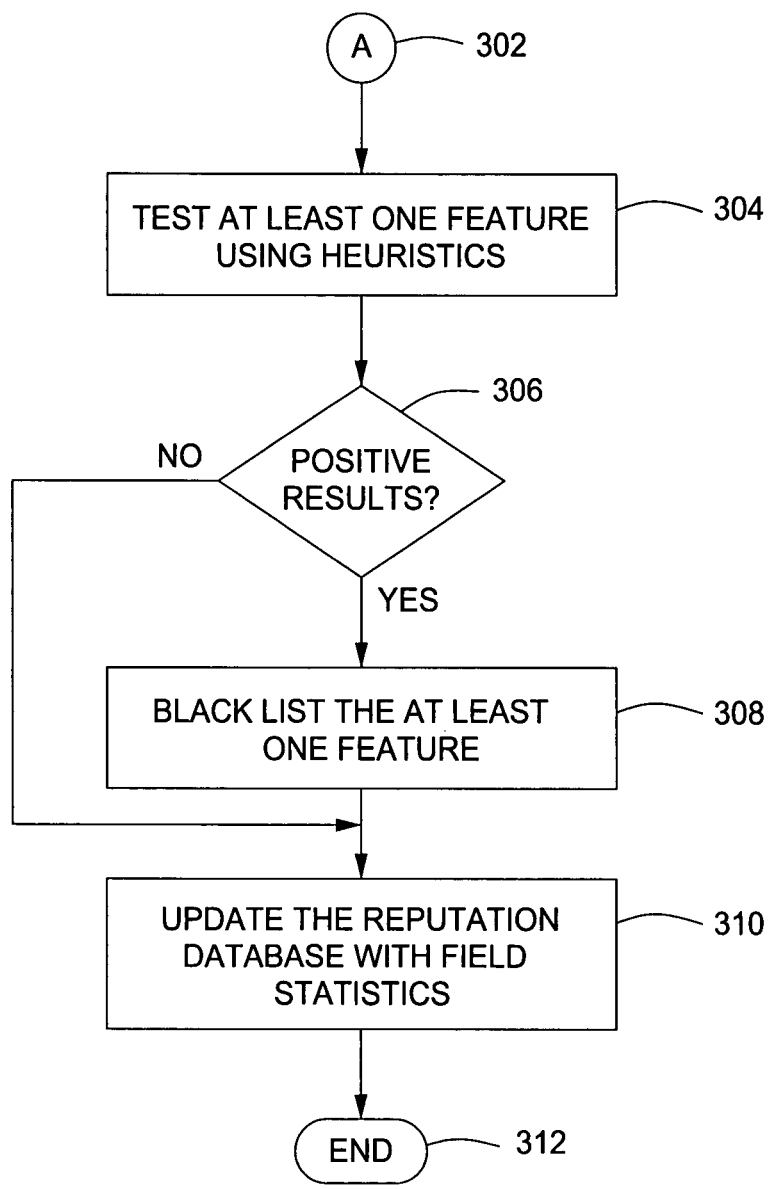
FIG. 3 is a flow diagram of a method for blacklisting a message feature in accordance with one or more embodiments of the present invention.

FIG. 3 is a flow diagram depicting a method 300 for additional processing of the SPAM filters and the reputation database 138. The method 300 continues from step 212 of the method 200, as described above. In one embodiment, the method 300 begins at step 302 and proceeds to step 304.

At step 304, one or more message features are tested using heuristics in order to determine if one or more predictive SPAM filters can be created. In one embodiment, only message features of the reputation database 138 not chosen for SPAM filter generation are tested. Information used by the heuristics is gathered from field statistics and/or network procedure calls (e.g., ping, trace, whois, nslookup, and the like). The heuristics test may include but is not limited to determining if the host IP address of the domain is already blacklisted, determining if a content of a web page contains previously identified SPAM or malware content, determining if a name server has a configurable percentage of SPAM web sites, determining if a domain registration date (e.g., obtained from VeriSign or a whois lookup) is more recent than a definable threshold of time, and/or determining if there is an overlap between the host IP address and known zombies or bot nets. In another embodiment, the heuristics test may compare message features to a SPAMMY profile (e.g., data regarding message features associated with SPAM) to determine if filters should be generated. For example, a sponsoring registrar of an .org domain is compared with SPAMMY profiles. In another example, using regular expressions, a domain name and/or a name server is compared with SPAMMY profiles (e.g., SPAMMY words).

At step 306, a determination is made whether the heuristics test returns a positive result. If the result is positive, then the method 300 proceeds to step 308. If the result is negative, then the method proceeds to step 310. At step 308, the one or more features are blacklisted and their reputations in the reputation database are changed to indicate that they have been blacklisted. For example, if the name server meets or exceeds the configurable percentage, as described above, the name server itself is blacklisted and a filter for the name server is generated. In another example, if the IP address hosts ten or more name servers and each has only one domain with a similar name as the name server, the IP address is blacklisted and/or a filter is generated. In one embodiment, if a feature becomes blacklisted, one or more SPAM filters may be generated for each associated feature that has a reputation indicating that the associated feature will be included in SPAM.

At step 310, the reputation database 138 is updated with field statistics. During step 310, the reputations of one or more of the message features of the reputation database are modified based on the changing face of SPAM. For example, persons guilty of SPAM change their techniques from time to time (e.g., change their domains, host IP addresses, country of origin, and the like). The reputations are updated to reflect the fact that the domain and/or the host IP address may no longer be associated with SPAM. If there is an existing SPAM filter for the domain and/or the host IP address, it should be altered (e.g., discontinued from service), as described above. At step 312, the method ends.

An example of one or more embodiments follows. As Anti-SPAM filters are produced by products and applications in the field, domain abc.com is determined to be SPAM and a filter is created. At the time of filter creation, the host IP address and name server are recorded (abc.com, 123.123.123.123, namserver1). Over time, additional filters are generated on domains def.com and ghi.com because these domains have the same IP address as abc.com (123.123.123.123). At this point, the IP address becomes blacklisted and any domain that comes into the backend system 108 that resolves to the host IP address of 123.123.123.123 has a filter automatically created for that address. As the process continues, additional IP addresses become blacklisted, (124.124.124.124, 125.125.125.125, and 126.126.126.126) because these IP addresses are all hosted on the same name server as 123.123.123.123 (nameserver1). Here, nameserver1 becomes blacklisted causing the blacklisting of all the IP addresses hosted on the nameserver1, which in turn blacklists all the domains on these IP addresses as well. Heuristics are used to predict which message features such as domains would be the best to filter immediately using field data collected from current Anti-SPAM filters. If it appears that the SPAM filter written on domain abc.com is firing and catching a lot of SPAM, then the domain abc.com and the family of domains related to that domain through IP addresses and name servers will be chosen as candidates for Anti-SPAM filters.

In summary, the foregoing process operates as follows:

```
Filter -> abc.com -> 123.123.123.123 -> nameserver1
Filter -> def.com ->123.123.123.123 -> nameserver1
Filter ->ghi.com -> 123.123.123.123 -> nameserver1
Blacklist -> 123.123.123.123
Auto Filter -> xdc.com -> 123.123.123 -> nameserver1
Auto Filter ->skw.com -> 123.123.123 -> nameserver1
Filter -> kef.com -> 124.124.124.124 -> nameserver1
Filter ->jkl.com -> 124.124.124.124 -> nameserver1
Filter -> swe.com -> 124.124.124.124 -> nameserver1
Blacklist -> 124.124.124.124
Auto Filter -> rrr.com -> 124.124.124.124 -> nameserver1
Filter -> qls.com -> 125.125.125.125 -> nameserver1
Filter -> toc.com -> 125.125.125.125 -> nameserver1
Filter ->llk.com -> 125.125.125.125 -> nameserver1
Blacklist -> 125.125.125.125
Filter ->spm.com -> 126.126.126.126 -> nameserver1
Filter -> pam.com -> 126.126.126.126 -> nameserver1
Filter -> opo.com -> 126.126.126.126 -> nameserver1
Blacklist -> 126.126.126.126
Blacklist -> nameserver1
Auto Filter -> 123.com -> 121.122.100.101 -> nameserver1
Auto Filter -> 45r.com -> 122.100.12.100 -> nameserver1
```

While the foregoing is directed to embodiments of the present invention, other and further embodiments of the invention may be devised without departing from the basic scope thereof, and the scope thereof is determined by the claims that follow.

The invention claimed is:

1. A method for creating predictive filters for messages, comprising:
   receiving a message filter that contains filter information at a filter manager, the filter manager being coupled to a reputation database;
   determining whether a reputation of a first message feature stored in the reputation database is associated with at least one portion of the filter information contained within the received message filter;
   generating, using at least one computer processor, at least one predictive filter for the first message feature, when it is determined that the reputation of the first message feature is associated with the at least one portion of the filter information,
   wherein the generated at least one predictive filter comprises one or more related message features associated with the first message feature, and
   wherein the at least one predictive filter for the first message feature is not generated when it is determined that the reputation of the first message feature is not associated with the at least one portion of the filter information;
   testing at least one message feature of the reputation database using heuristics; and
   blacklisting the at least one message feature based on the testing.

2. The method of claim 1, wherein the step of generating the at least one predictive filter further comprises comparing the filter information to reputation information within the reputation database.

3. The method of claim 1, further comprising:
   altering the at least one portion of the filter information when a reputation of the at least one portion of the filter information is no longer associated with a particular reputation.

4. The method of claim 1, further comprising:
   updating the reputation database using statistics produced by various messaging clients and filtering applications.

5. The method of claim 4, wherein the statistics comprises information regarding at least one of web site content, country of origin data, overall SPAM presence, overall email usage, trends in SPAM, common words in SPAM, and firing characteristics of filters.

6. The method of claim 1, wherein the first message feature comprises at least one of an information regarding web site content, a number of web sites hosting at least one of malware, spyware and SPAM, a name server, a host IP address, a country of origin, a country of residence of a domain registrant, a time to live of a domain zone file record, a number of name servers associated with a domain, a whois data, a number of times the name server has been changed for the domain, a value indicating whether the name server has the same name as the domain, a value indicating whether the domain is being used for domain tasting, a country location of at least one of the host IP address, email, SPAM, and virus volume being sent from at least one of the domain and the host IP address based on customer field statistics, a number of host IP addresses and domains known for sending tracked categories of SPAM, open relays, IP address allocation, and an use history of at least one of IP addresses and ranges of IP addresses.

7. The method of claim 1, wherein the filter information comprises at least one filter for at least one of a name server, a domain name, a country of origin, and a host IP address, wherein the at least one filter is keyed on recent SPAM.

8. The method of claim 1, wherein the heuristics comprises at least one of determining whether the host IP address of the domain is already blacklisted, determining whether a content of a web page contains previously identified SPAM or malware content, determining whether a name server has a configurable percentage of SPAM web sites, determining whether a domain registration date is more recent than a definable threshold of time, determining whether there is an overlap between the host IP address and at least one of a known zombie and a bot net, and comparing message features to a profile of words common to SPAM for determining whether filters should be generated.

9. The method of claim 1, wherein the message filter that contains the filter information is a SPAM filter previously generated.

10. The method of claim 1, wherein the at least one predictive filter for the first message feature is generated when it is determined that the reputation of the first message feature associated with the at least one portion of the filter information is a negative reputation, and the at least one predictive filter prevents transmission of at least one email message.

11. An apparatus for creating predictive filters for messages, comprising:
    a filter manager coupled to a reputation database;
    means for receiving a message filter that contains filter information, determining whether a reputation of a first message feature stored in the reputation database is associated with at least one portion of the filter information contained within the received message filter, and generating at least one predictive filter for the first message feature when it is determined that the reputation of the first message feature is associated with the at least one portion of the filter information,
    wherein the generated at least one predictive filter comprises one or more related message features associated with the first message feature, and
    wherein the at least one predictive filter for the first message feature is not generated when it is determined that the reputation of the first message feature is not associated with the at least one portion of the filter information;
    means for testing at least one message feature of the reputation database against heuristics and
    means for blacklisting the at least one message feature based on the testing.

12. The apparatus of claim 11, further comprising:
    means for comparing the filter information to reputation information within the reputation database.

13. The apparatus of claim 11, further comprising:
    means for altering the at least one portion of the filter information when a reputation of the at least one portion of the filter information is no longer associated with a particular reputation.

14. The apparatus of claim 11, further comprising:
    means for updating the reputation database using statistics produced by various messaging clients and filtering applications.

15. A system for creating predictive filters, comprising:
    at least one of a recipient computer and a mail server to provide filter information; and
    a backend system coupled to a reputation database, the backend system including a filter reception module to receive a message filter that contains first filter information, a determination module to determine whether a reputation of a first message feature stored in the reputation database is associated with at least one portion of the filter information contained within the received message filter, a filter generation module to generate at least one predictive filter for the first message feature when it is determined that the reputation of the first message feature is associated with the at least one portion of the filter information, a testing module to test at least one message feature of the reputation database using heuristics, and a blacklisting module to blacklist the at least one message feature based on the testing, wherein the generated at least one predictive filter comprises one or more related message features associated with the first message feature, and wherein the at least one predictive filter for the first message feature is not generated when it is determined that the reputation of the first message feature is not associated with the at least one portion of the filter information.

16. The system of claim 15, wherein the at least one of the mail server and the recipient computer provide statistics to update the reputation of the message feature.

* * * * *